United States Patent
Matsuoka (10) Patent No.: US 9,387,594 B2
(45) Date of Patent: Jul. 12, 2016

(54) GRIPPING DEVICE

(71) Applicant: TOYOTA JIDOSHA KABUSHIKI KAISHA, Toyota-shi (JP)

(72) Inventor: Hirofumi Matsuoka, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/768,696

(22) PCT Filed: Apr. 11, 2013

(86) PCT No.: PCT/JP2013/060927
§ 371 (c)(1),
(2) Date: Aug. 18, 2015

(87) PCT Pub. No.: WO2014/128982
PCT Pub. Date: Aug. 28, 2014

(65) Prior Publication Data
US 2015/0375404 A1 Dec. 31, 2015

(30) Foreign Application Priority Data
Feb. 20, 2013 (JP) ................................. 2013-031562

(51) Int. Cl.
*B66C 1/42* (2006.01)
*B25J 19/02* (2006.01)
*B25J 15/00* (2006.01)

(52) U.S. Cl.
CPC ............ *B25J 19/021* (2013.01); *B25J 15/0023* (2013.01)

(58) Field of Classification Search
CPC .. B25J 19/021; B25J 15/0023; B25J 15/0033; B25J 13/08; B25J 19/025

USPC .......................... 294/86.4, 119.3, 907; 901/47
See application file for complete search history.

(56) References Cited

U.S. PATENT DOCUMENTS

| | | | | |
|---|---|---|---|---|
| 5,083,824 A | * | 1/1992 | Sato | B65G 47/908 294/119.3 |
| 5,372,786 A | * | 12/1994 | Iles | B01L 9/06 206/562 |

(Continued)

FOREIGN PATENT DOCUMENTS

| CN | 2541836(Y) | 3/2003 |
|---|---|---|
| CN | 102858502(A) | 1/2013 |

(Continued)

OTHER PUBLICATIONS

International Search Report Issued May 14, 2013 in PCT/JP13/060927 Filed Apr. 11, 2013.

(Continued)

*Primary Examiner* — Gabriela Puig
(74) *Attorney, Agent, or Firm* — Oblon, McClelland, Maier & Neustadt, L.L.P (57) ABSTRACT

A gripping device is equipped with an abutment member that is annexed on a region of a gripping portion that abuts on a work. The abutment member is equipped with an inner bag that is made of a material having elasticity, a particulate matter with which the inner bag is filled, and an outer bag that covers the inner bag. The particulate matter is hardened while being deformed into a shape matching a contour of the work by increasing a ratio of a volume of the particulate matter to an inner volume of the inner bag with the work gripped by the gripping portion. A reverse face of the outer bag and a surface of the inner bag have a light-emitting portion therebetween. Thus, a rupture created in the outer bag can be detected, and the breakage of the inner bag can be obviated.

6 Claims, 11 Drawing Sheets

(56) References Cited

U.S. PATENT DOCUMENTS

| | | | |
|---|---|---|---|
| 8,651,543 B2* | 2/2014 | Matsuoka | B25J 15/0023 294/119.1 |
| 2013/0033050 A1 | 2/2013 | Matsuoka et al. | |
| 2013/0310980 A1* | 11/2013 | Matsuoka | B25J 15/0023 700/260 |
| 2014/0148951 A1* | 5/2014 | Saen | B25J 13/083 700/259 |
| 2015/0190929 A1* | 7/2015 | Matsuoka | B25J 15/08 294/119.1 |

FOREIGN PATENT DOCUMENTS

| | | |
|---|---|---|
| JP | 61-150894 | 9/1986 |
| JP | 2001249005(A) | 9/2001 |
| JP | 2007-303104 A | 11/2007 |
| JP | 2011-230260 A | 11/2011 |

OTHER PUBLICATIONS

Partial Translation of Office Action mailed Apr. 6, 2016 and issued to JP2013-031562.

* cited by examiner

A-A CROSS-SECTIONAL VIEW

FIG. 2C

B-B CROSS-SECTIONAL VIEW

GRIPPING DEVICE

TECHNICAL FIELD

The invention relates to a gripping device.

BACKGROUND ART

According to an art disclosed in Japanese Patent Application Publication No. 2011-230260 (JP 2011-230260 A), an abutment member having an inner bag that is filled with a particulate matter and an outer bag that covers the inner bag is provided at a tip of a gripping portion of a gripping device. After the abutment member is deformed along the contour of a work, air is removed from the inner bag. Thus, the abutment member is hardened while maintaining the shape thereof. Besides, the enhancement of durability is achieved by fabricating the outer bag from a woven cloth made of aramid fiber.

SUMMARY OF THE INVENTION

Problem to Be Solved by the Invention

When the gripping by the gripping device is repeated, a hole may open in the outer bag due to abrasion, incision or the like, so the inner bag may be exposed from the outer bag. Then, when a hole opens in the outer bag, the work comes into direct contact with the inner bag, thus breaking the inner bag. The breakage of the inner bag becomes known for the first time due to a decrease in the degree of vacuum of the inner bag, a fall of the work or the like. Therefore, when it turns out that the inner bag has broken, the stoppage of a production line on which the gripping device is installed is caused.

Accordingly, it is desirable to carry out the maintenance and management by replacing the outer bag as soon as a hole opens in the outer bag, namely, before the inner bag breaks. However, the gripping device may be used to grip a work to which oil, chips and the like have adhered, such as a mechanical part. As a result, dirt may adhere to the outer bag. In such a state, it is difficult to confirm, through visual observation, whether or not the outer bag has broken.

Means for Solving the Problem

A gripping device according to the invention is a gripping device having a gripping portion that grips a work while clamping the work. The gripping device is equipped with an abutment member that is annexed on a region of the gripping portion that abuts on the work. The abutment member is equipped with an inner bag that is made of a material having elasticity, a particulate matter with which the inner bag is filled, and an outer bag that covers the inner bag. The particulate matter is hardened while being deformed into a shape matching a contour of the work by increasing a ratio of a volume of the particulate matter to an inner volume of the inner bag with the work gripped by the gripping portion. A reverse face of the outer bag and a surface of the inner bag have a light-emitting portion therebetween.

The light-emitting portion is provided on at least one of the reverse face of the outer bag and the surface of the inner bag.

In a preferred embodiment of the invention, the light-emitting portion emits light in response to ultraviolet light.

In another embodiment of the invention, the light-emitting portion is constituted by a light storage member.

Effect of the Invention

According to the invention, when the outer bag ruptures, an image of a ruptured region of the outer bag can be made to emerge in a dark place by the light-emitting portion, and can be visually observed with ease. Thus, a rupture created in the outer bag can be detected, and the breakage of the inner bag can be obviated, independently of the dirt on the outer bag.

BRIEF DESCRIPTION OF THE DRAWINGS

FIG. 2 includes views showing a gripping portion of the gripping device. FIG. 2 (a) is a front view. FIG. 2 (b) is an A-A cross-sectional view. FIG. 2 (c) is a B-B cross-sectional view.

FIG. 9 includes views showing embodiments of arrangement of a light-emitting member on the abutment member. FIG. 9 (a) shows the first embodiment of the invention. FIG. 9 (b) shows the second embodiment of the invention. FIG. 9 (c) shows the third embodiment of the invention. FIG. 9 (d) shows the fourth embodiment of the invention. FIG. 9 (e) shows the fifth embodiment of the invention. FIG. 9 (f) shows the sixth embodiment of the invention.

MODES FOR CARRYING OUT THE INVENTION

Figure 1:
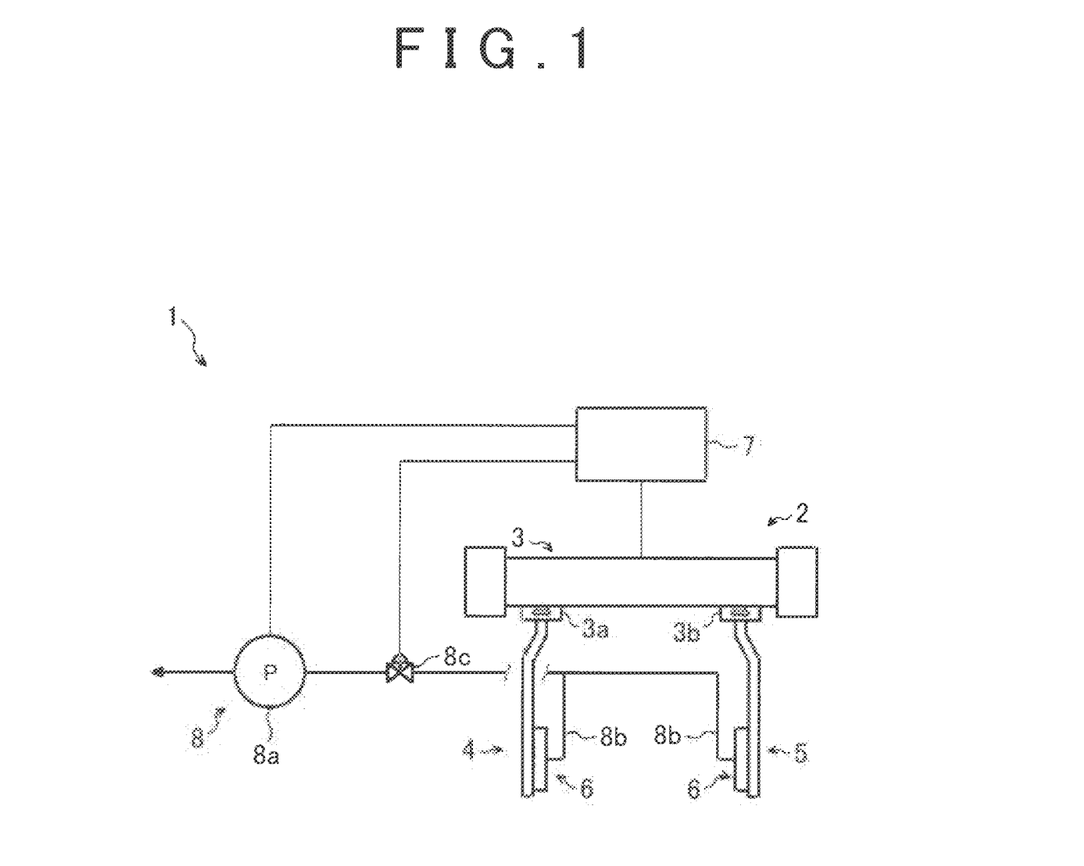
FIG. 1 is a view showing a gripping device.

A gripping device 1 is a device for gripping and holding a work or the like. As shown in FIG. 1, the gripping device 1 is equipped with a gripping portion 2, a control unit 7, and a vacuum exhaust facility 8. The gripping portion 2 is a region for directly gripping the work, and is equipped with a drive portion 3, a plurality of claw portions 4 and 5, and a plurality of abutment members 6.

Figure 2A:
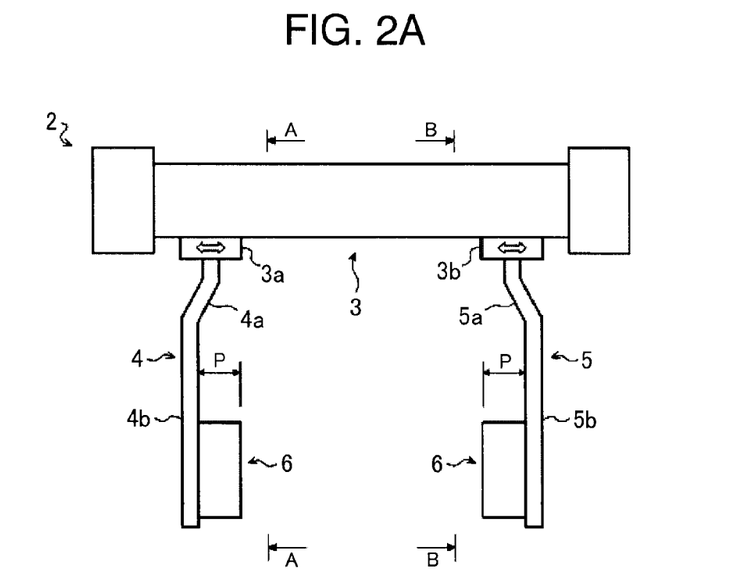

As shown in FIGS. 1 and 2, the drive portion 3 is equipped with two-line slider portions 3a and 3b. The respective slider portions 3a and 3b can be displaced in a reciprocating manner with respect to the same axial direction, independently of each other. For example, an electric actuator equipped with a reciprocating mechanism that is constituted of a ball screw, a nut, a motor and the like can be adopted as the drive portion 3.

The claw portions 4 and 5 are a pair of regions that are provided to clamp the work. The claw portions 4 and 5 clamp and grip the work, which is arranged at a midpoint between the claw portions 4 and 5. Incidentally, the shape of the respective claw portions 4 and 5 is set in consideration of the shape and size of the work to be gripped, the stroke amount of the respective slider portions 3a and 3b, and the like.

Figure 2B:
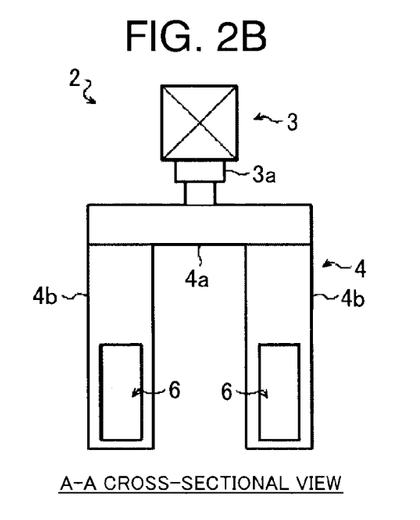

As shown in FIG. 2 (b), the claw portion 4 is equipped with a support portion 4a, and two clamp portions 4b and 4b that protrude from the support portion 4a. The clamp portions 4b and 4b are arranged apart from each other by a predetermined clearance. Besides, the claw portion 4 has an annexation face 4g on which the abutment members 6 are annexed. The support portion 4a of the claw portion 4 is fixed to the slider portion 3a. Then, the control unit 7 operates the drive portion 3 to slide the slider portion 3a, thus moving the respective clamp portions 4b and 4b in a reciprocating manner along a sliding direction of the slider portion 3a (see FIG. 1).

Figure 2C:
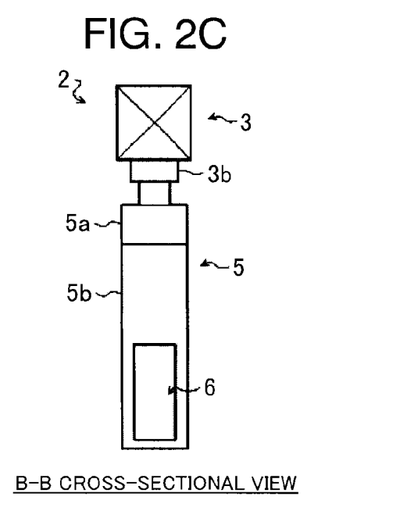

Besides, as shown in FIG. 2 (c), the claw portion 5 is equipped with a support portion 5a, and a clamp portion 5b that protrudes from the support portion 5a. Besides, the claw portion 5 has an annexation face on which the abutment member 6 is annexed. The support portion 5a of the claw portion 5 is fixed to the slider portion 3b. Then, the control unit 7 operates the drive portion 3 to slide the slider portion 3b, thus moving the clamp portion 5b in a reciprocating manner along a sliding direction of the slider portion 3b (see FIG. 1).

Each of the abutment members 6 is a region of the gripping device 1 that directly abuts on the work, and realizes two opposite modes, namely, a mode in which the shape thereof can be flexibly deformed and a mode in which the shape thereof is firmly maintained, as a single member. Each of the abutment members 6 usually assumes the mode in which the shape thereof can be flexibly deformed.

As shown in FIGS. 1 and 2, the abutment members 6 are annexed on the clamp portions 4b, 4b, and 5b of the claw portions 4 and 5 respectively, and are connected to the vacuum exhaust facility 8. The vacuum exhaust facility 8 constitutes means for hardening and softening the abutment members 6, and is equipped with a vacuum pump 8a, P, vacuum pipelines 8b and 8b, and an electromagnetic valve 8c, Then, the vacuum pipelines 8b and 8b are connected to bag-like portions of the abutment members 6 respectively. Incidentally, in the present embodiment of the invention, the case where the vacuum exhaust facility 8 is equipped with the vacuum pump P is exemplified. However, it is also possible to adopt a configuration in which the vacuum exhaust facility 8 is equipped with exhaust means other than the vacuum pump P (e.g., an ejector or the like). Besides, the means for realizing the hardening and softening of the abutment members is not absolutely required to be a vacuum exhaust facility. Any means capable of realizing the hardening and softening of the abutment members can be adopted.

When the vacuum pump P is operated to reduce the pressure of the interiors of the bag-like portions of the abutment members 6, respective particles constituting a particulate matter with which the bag-like portions are filled are more tightly anchored to one another, so the abutment members 6 are hardened. Therefore, at this time, the abutment members 6 assume the mode in which the shape thereof is firmly maintained.

When these abutment members 6 are pressed against the work in their soft state through clamping pressures applied by the claw portions 4 and 5, it is possible to cause the abutment members 6 to enter a convexo-concave portion of the surface of the work. Thus, the abutment members 6 can be deformed along the contour of the work. Then, the abutment members 6 can be hardened into a shape corresponding to the contour of the work by operating the vacuum exhaust facility 8. Thus, the solid abutment members 6 corresponding to the contour of the work can be formed.

With the gripping portion 2 according to the present embodiment of the invention, the work can be firmly gripped at three points by the abutment members 6 that are annexed on the clamp portions 4b, 4b, and 5b respectively. A stable gripping state that can endure a swinging motion or the like of the work can be realized with a simple configuration having a small number of parts.

The foregoing claw portions 4 and 5 need to be ensured of rigidity in order to accomplish a predetermined clamping force, and hence are generally constituted by a material having a predetermined hardness, such as steel or the like. Therefore, when the claw portions 4 and 5 are brought into direct abutment on the work, the work may be broken etc. by the claw portions 4 and 5. Besides, the work assumes various shapes. Therefore, with a view to realizing a stable gripping state, the shape of the regions of the claw portions 4 and 5 that abut on the work needs to correspond to the shape of the work. Therefore, with the gripping device 1, the abutment members 6 are annexed on those regions of the clamp portions 4b, 4b, and 5b as clamping portions of the gripping portion 2 which abut on the work, respectively.

Figure 3:
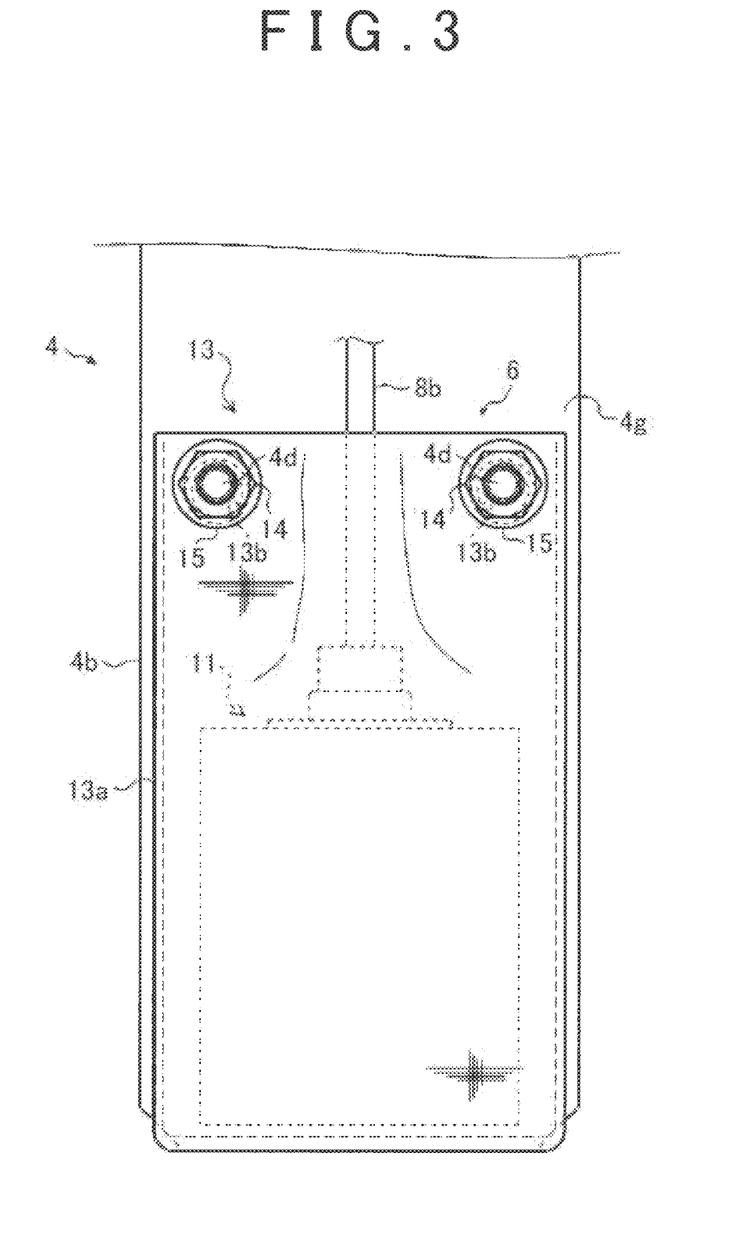
FIG. 3 is a front view of an abutment member.
Figure 4:
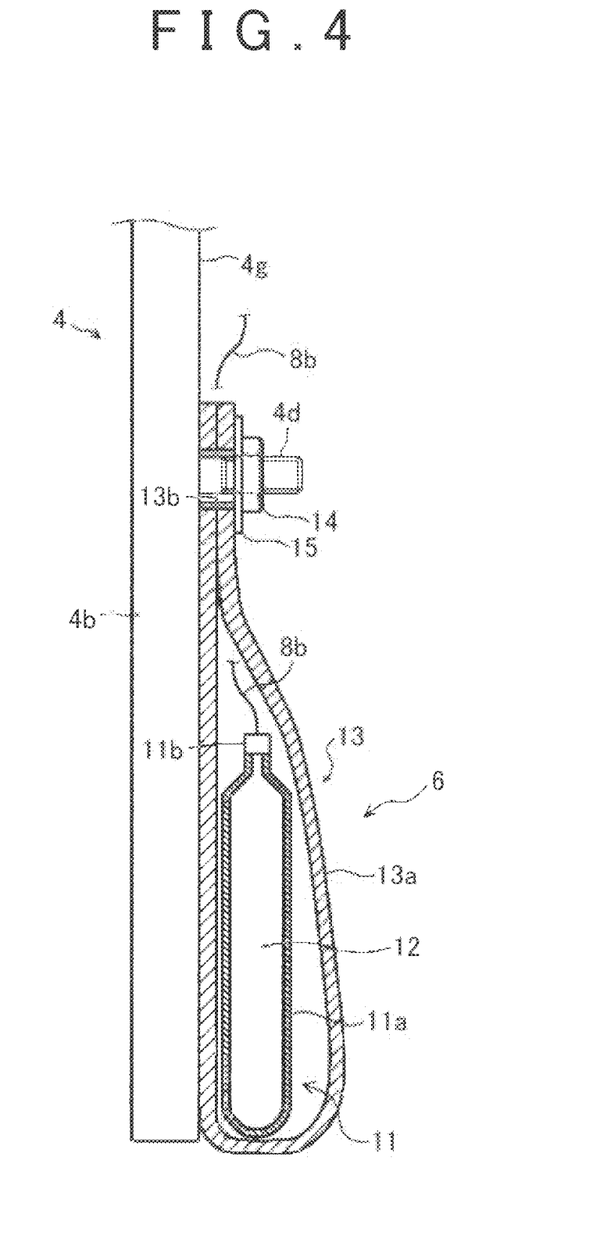
FIG. 4 is a lateral cross-sectional view of the abutment member.

Each of the abutment members 6 is a member that can realize the two opposite modes, namely, the mode in which the shape thereof can be flexibly deformed and the mode in which the shape thereof is firmly maintained, as a single member. As shown in FIGS. 3 and 4, each of the abutment members 6 is equipped with an inner bag 11 and an outer bag 13 that covers the inner bag 11. This configuration makes it possible to simply and reliably prevent the inner bag 11 from being abraded through repeated use or being cut by the chips and the like adherent to the work. As a result, the product cycle of the inner bag 11 can be prolonged.

Figure 5:
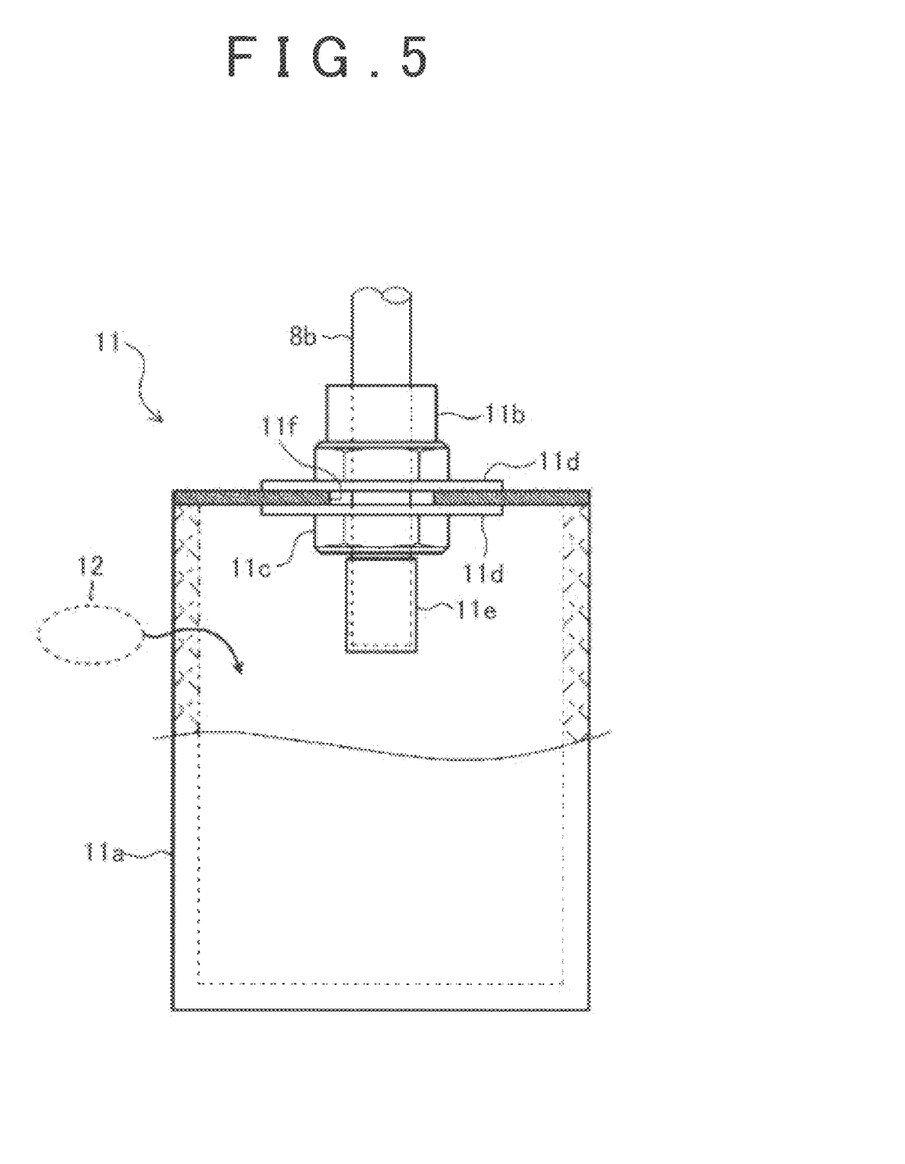
FIG. 5 is a view showing an inner bag of the abutment member.

As shown in FIG. 5, the inner bag 11 is equipped with a bag body 11a, a connection port 11b, and the like. The bag body 11a in the present embodiment of the invention is a member made of nitrile rubber (NBR), and is fabricated through the use of a first rubber member and a second rubber member. The first rubber member is obtained by heating and press-molding crude rubber and molding it into the shape of a box (a pentahedron). The second rubber member assumes a sheet-like shape. More specifically, according to this configuration, the bag body 11a having air-tightness and elasticity is obtained by sticking the sheet-like second rubber member to an opening region of the box-shaped first rubber member through vulcanization and welding, and forming them into the shape of a box (a hexahedron). Besides, a hole portion 11f is formed through one face of the bag body 11a at a substantially central portion thereof. The connection port 11b as a member for establishing communication between the interior and exterior of the bag body 11a is disposed in the hole portion 11f. The connection port 11b is annexed on the hole portion 11f while ensuring air-tightness of the hole portion 11f, by inserting sealing members 11d and 11d thereinto and screwing and fastening a nut 11c thereto. Besides, the vacuum pipeline 8b is connected to the connection port 11b, and a filter 11e is disposed at an end portion of the connection port 11b that is encapsulated by the bag body 11a.

The interior of the bag body 11a is filled with a particulate matter 12 as an aggregate of a plurality of particles. Due to the filling of the interior of the bag body 11a with the particulate matter 12, the inner bag 11 can realize the two opposite modes, namely, the mode in which the shape thereof can be flexibly deformed and the mode in which the shape thereof is firmly maintained, as a single member. By providing the connection port 11b with the filter 11e, there is realized a configuration for preventing the particulate matter 12 from being discharged from the connection port 11b.

When air is removed from the interior of the bag body 11a and the ratio of the volume of the particulate matter 12 to the inner volume of the bag body 11a increases, the gaps among the respective particles constituting the particulate matter 12 with which the interior of the bag body 11a is filled decrease, and the respective particles are anchored to one another. As a result, the particulate matter 12 decreases in fluidity, and is hardened into the shape of a lump. When air is reintroduced into the bag body 11a with the particulate matter 12 hardened in the shape of a lump, the ratio of the volume of the particulate matter 12 to the inner volume of the bag body 11a decreases, so the gaps among the respective particles constituting the particulate matter 12 increase and the respective particles are stopped from being anchored to one another. As a result, the particulate matter 12 increases in fluidity, and is softened.

Incidentally, in the present embodiment of the invention, the case where nitrile rubber (NBR) is adopted as a material of the inner bag 11 (the bag body 11a) is exemplified, but the material constituting the inner bag 11 should not be limited thereto. Various materials can be adopted in accordance with the conditions such as working environments and the like, as long as they have elasticity and air-tightness.

Figure 6:
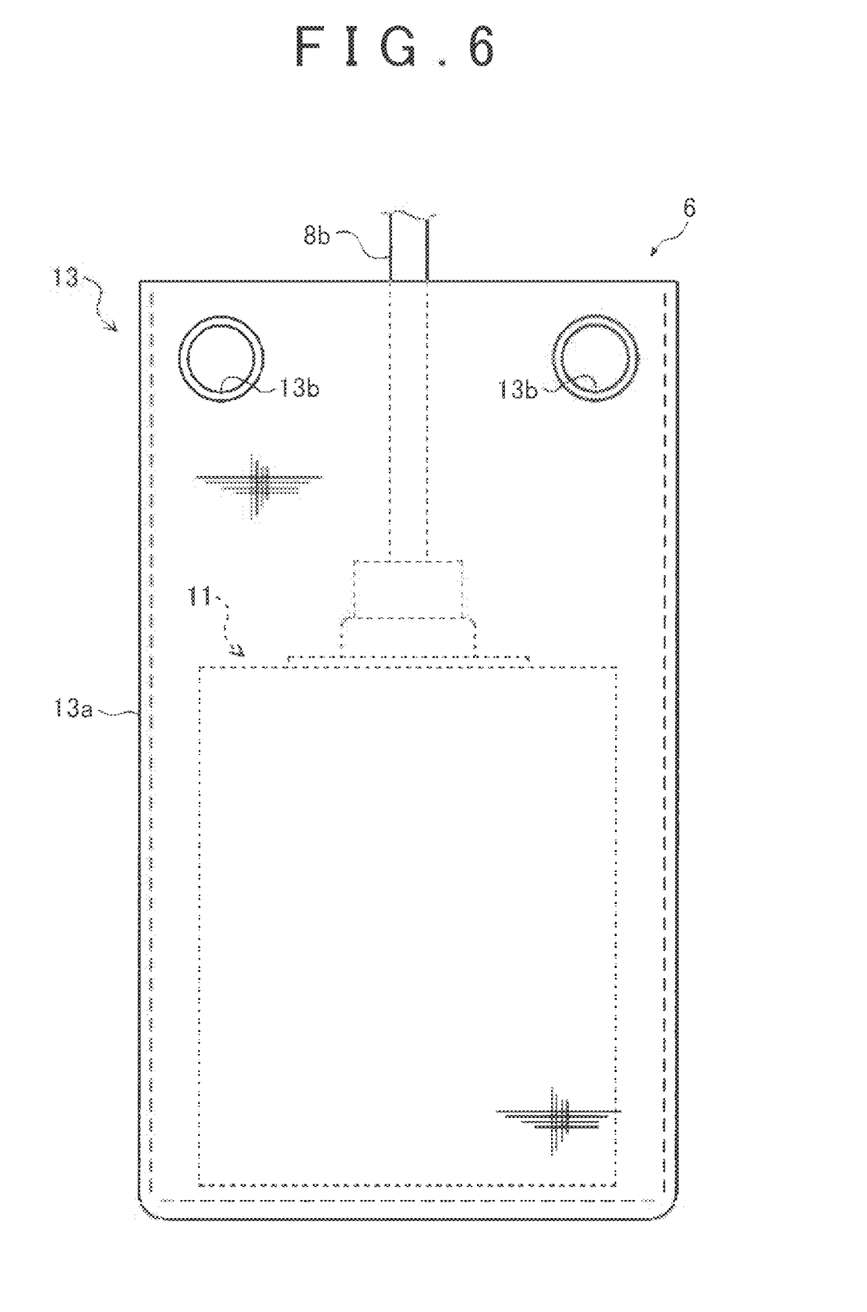
FIG. 6 is a view showing an outer bag of the abutment member.

As shown in FIG. 6, the outer bag 13 is a member for covering and protecting the inner bag 11, and is equipped with a bag body 13a, anchorage portions 13b and 13b, and the like. The bag body 13a is a member made of aramid fiber, which is a material exhibiting abrasion resistance and incision resistance. The bag body 13a is a member that is obtained by superimposing two substantially rectangular sheet-like members made of aramid fiber on each other, sewing three respective side portions thereof, and forming them into the shape of a bag. The interior of the bag body 13a is in such a size that the inner bag 11 can be displaceably accommodated therein. Besides, the anchorage portions 13b and 13b serving as regions for suspending the outer bag 13, and the like are annexed in the vicinity of unsewn opening side portions of the bag body 13a, The present embodiment of the invention adopts a simple configuration in which metal eyelets are adopted as the anchorage portions 13b and 13b.

In the present embodiment of the invention, aramid fiber is adopted as a material of the outer bag 13 (the bag body 13a). Aramid fiber is a material exhibiting excellent abrasion resistance and excellent incision resistance, and hence can protect the inner bag 11 from being abraded or cut. Besides, aramid fiber is flexible enough to conform to the shape of a work. Therefore, the inner bag 11 accommodated in the outer bag 13 can be accurately made to conform to the shape of the work that is in contact with the inner bag 11 via the outer bag 13. For this reason, aramid fiber is preferred as a material forming the outer bag 13 (the bag body 13a). In this case, aramid fiber can be used in any form such as a woven fabric, a knitted fabric, a non-woven fabric or the like. However, aramid fiber is preferably used in the form of a woven fabric in order to achieve both sufficient flexibility and sufficient durability.

Incidentally, in the present embodiment of the invention, the case where aramid fiber is adopted as a material of the outer bag 13 is exemplified, but the material constituting the outer bag 13 should not be limited thereto. Various materials can be adopted as long as they exhibit excellent abrasion resistance and excellent incision resistance and are flexible enough to conform to the shape of the work.

Each of the abutment members 6 is configured such that the inner bag 11 and the outer bag 13 are separate from each other, and the inner bag 11 and the outer bag 13 are displaceable relatively to each other, so the inner bag 11 is not prevented from being deformed by being dragged by the outer bag 13. Therefore, the inner bag 11 can be accurately deformed along the shape of the work via the outer bag 13, and the abutment member 6 can be accurately made to conform to the shape (the convexo-concave portion) of the work. That is, owing to the configuration in which the inner bag 11 and the outer bag 13 are separate from each other, the abutment member 6 is improved so as to realize a firmer gripping state than an abutment member having a double-structure bag body with an inner bag and an outer bag integrated with each other. Furthermore, the abutment member 6 is excellent in economic efficiency as well, because only the inner bag 11 can be replaced when the inner bag 11 is damaged, and only the outer bag 13 can be replaced when the outer bag 13 is damaged.

As shown in FIGS. 3 and 4, the abutment member 6 is suspended by the anchorage portions 13b and 13b of the outer bag 13, with respect to the bolts 4d and 4d of the clamp portion 4b, Then, with the abutment member 6 (the outer bag 13) suspended from the anchorage portions 13b and 13b, nuts 14 and 14 are fastened onto the bolts 4d and 4d via washers 15 and 15, so there is realized a configuration for simply and reliably annexing the abutment member 6 on the clamp portion 4b, Owing to this configuration, the abutment member 6 is easily replaced. Thus, the introduction into an actual production line on which the abutment members 6 are estimated to be abraded and cut can be easily realized.

Incidentally, the case where the abutment member 6 is annexed on the clamp portion 4b of the claw portion 4 has been described herein as an example. However, at the clamp portion 5b of the claw portion 5 as well, a bolt is protrusively provided on a disposition face. The abutment member 6 is suspended from the bolt, and is fixed through the use of a nut, a washer and the like. Thus, the abutment member 6 (not shown) is annexed in a similar manner.

Figure 7:
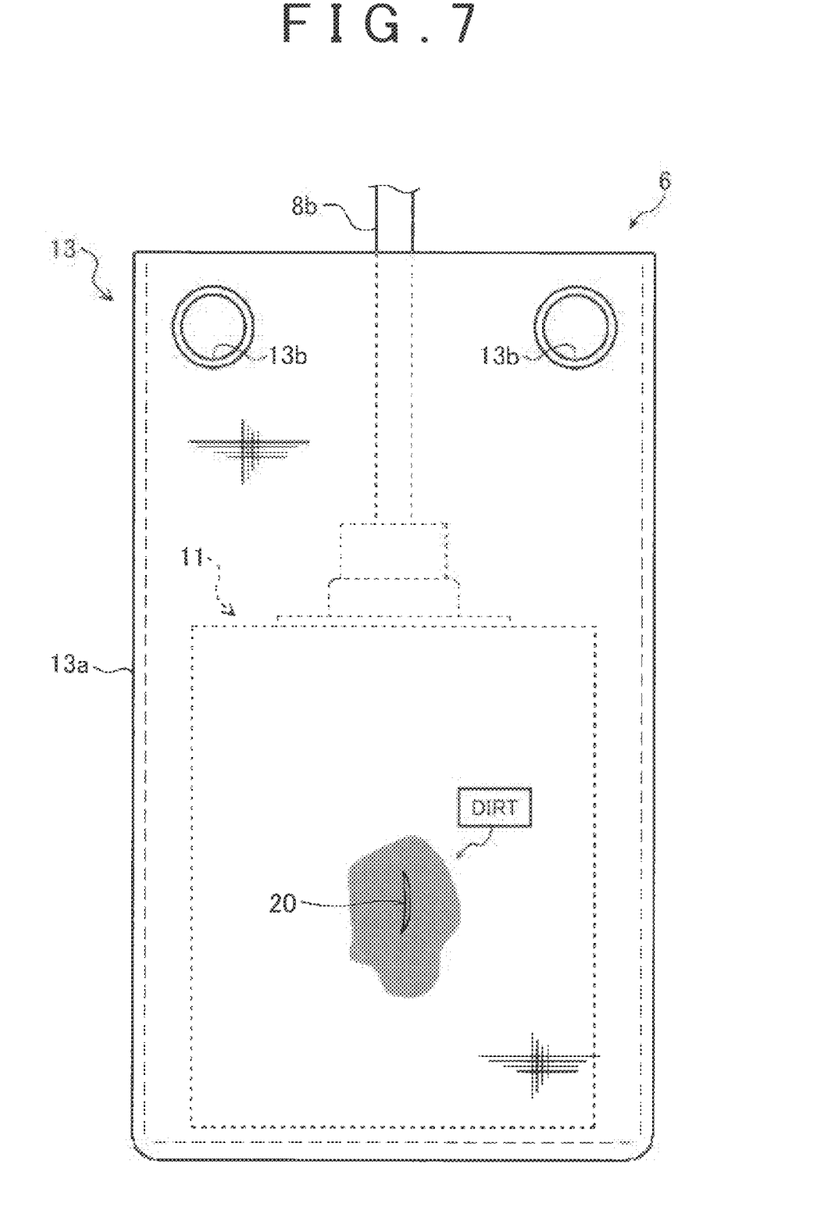
FIG. 7 is a view showing how a rupture is created in the abutment member.

As shown in FIG. 7, when the number of times of contact between the outer bag 13 of the abutment member 6 and the work increases, a rupture (a rupture portion 20) may be created in the outer bag 13 of the abutment member 6 due to aged deterioration or the like. However, the outer bag 13 is in direct contact with the work, and hence may become dirty due to the cutting fluid, chips and the like adherent to the work. Therefore, when inspecting whether or not a rupture is created in the abutment member 6, it is sometimes difficult to detect the rupture through visual observation. As a result, the rupture created in the outer bag 13 may be overlooked.

Figure 8:
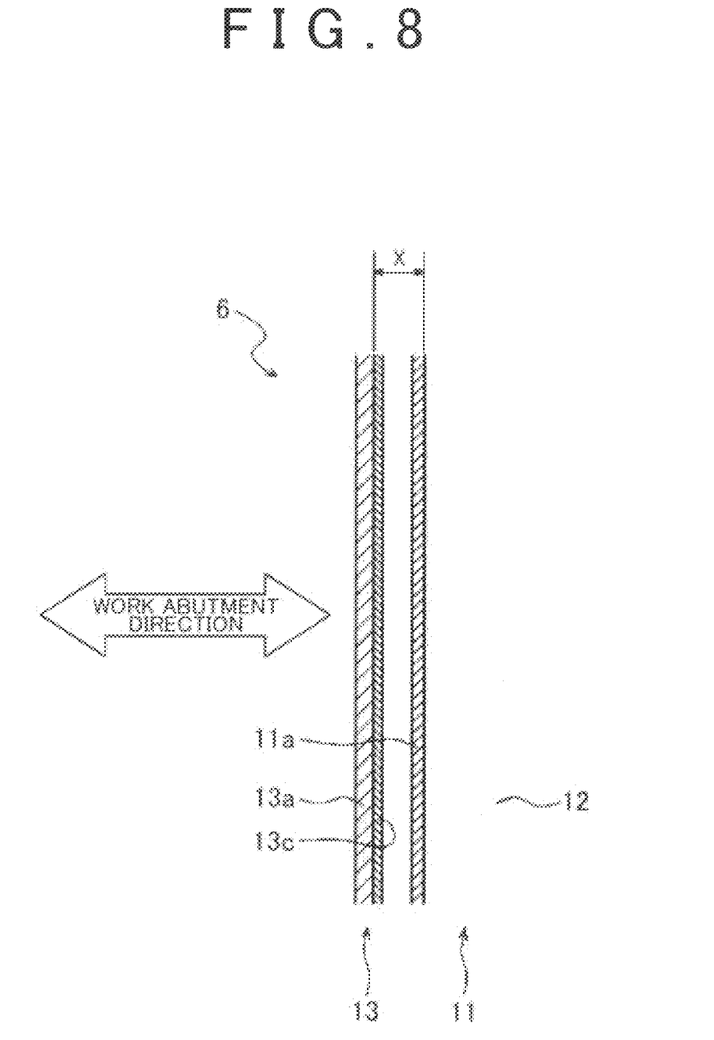
FIG. 8 is a partial cross-sectional schematic view showing the details of the abutment member.

As shown in FIG. 8, the abutment member 6 is configured such that the outside of the inner bag 11 that is filled with the particulate matter 12 is covered with the outer bag 13. As described already, the bag body 11a made of NBR, which constitutes the inner bag 11, is filled with the particulate matter 12. Besides, the outer bag 13 is equipped with a lining 13c on a reverse face of the bag body 13a made of aramid fiber (a face that is in contact with the inner bag 11). The lining 13c is made of membrane-like polyethylene terephthalate (PET). According to this configuration, the reverse face of the bag body 13a is covered by applying PET to the reverse face of the bag body 13a.

By providing the lining 13c on the reverse face of the bag body 13a, the outer bag 13 (the bag body 13a) made of aramid fiber and the inner bag 11 (the bag body 11a) made of NBR are in direct contact with each other, so the bag body 11a made of NBR is prevented from being damaged due to friction with the bag body 13a made of aramid fiber.

Figure 9:
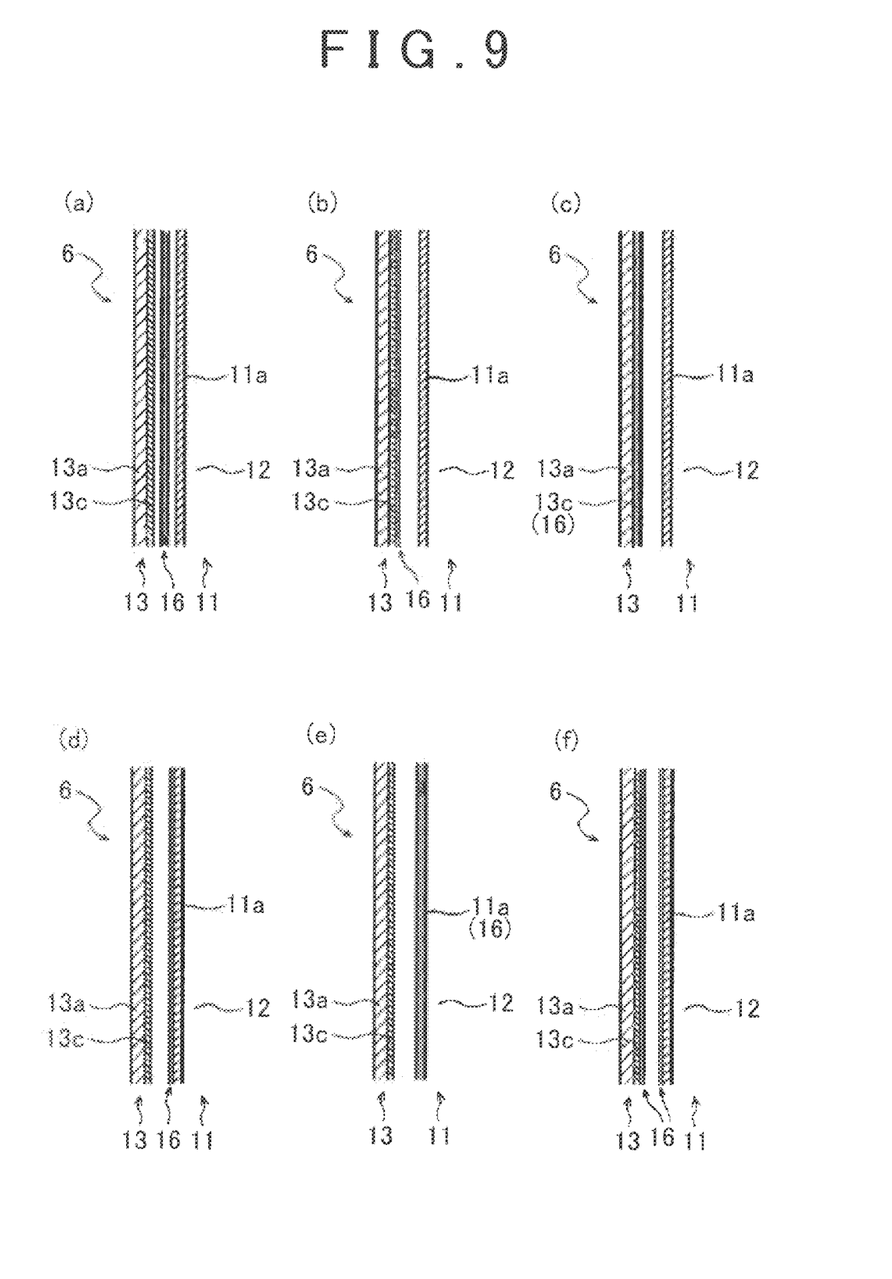

As shown in FIG. 9, a light-emitting portion 16 that is constituted by a light-emitting material is provided in a range from the reverse face of the bag body 13a of the outer bag 13 to the surface of the bag body 11a of the inner bag 11 (or the particulate matter 12) (a range X shown in FIG. 8). The light-emitting portion 16 emits light from itself, or is configured to include a light-emitting member that emits light by being irradiated with light in a predetermined frequency spectrum.

As a material constituting the light-emitting portion 16 (the light-emitting member), a member that emits light after absorbing light energy (ultraviolet light) such as sunlight, illumination light or the like and that can continue to emit light from itself even after being stopped from being supplied with light energy (a light storage member) may be used. The light storage member can be used in a mode in which a light storage pigment is directly used as a paint, a mode in which a light storage pigment is mixed with resin to be used as a sheet-like or thread-like molded article, or the like. In addition, as the material constituting the light-emitting portion 16 (the light-emitting member), a member that emits light by being irradiated with ultraviolet light (black light) (a fluorescent member) may be used. The fluorescent member can be used in a mode in which a fluorescent substance is used as a paint, a mode in which the paint is mixed with resin to be used as a sheet-like or thread-like molded article, or the like.

In the first embodiment of the invention shown in FIG. 9 (a), the light-emitting portion 16 is arranged between the inner bag 11 and the outer bag 13 (in the range X shown in FIG. 8). The light-emitting portion 16 that is used in this arrangement situation can adopt a mode in which a light-emitting member is configured in the shape of a sheet, a mode in which a thread-like light-emitting member is woven into a sheet-like substrate, a mode in which a paint-like light-emitting member is applied to a sheet-like substrate, or the like.

Next, a method of detecting the rupture portion 20 will be described using FIGS. 10 and 11. The first embodiment of the invention is configured such that the outer bag 13 is equipped on the inside thereof with the light-emitting portion 16 so that the light-emitting portion 16 emerges in a visually recognizable state through the rupture portion 20 when the rupture portion 20 is created in the outer bag 13.

Figure 10:
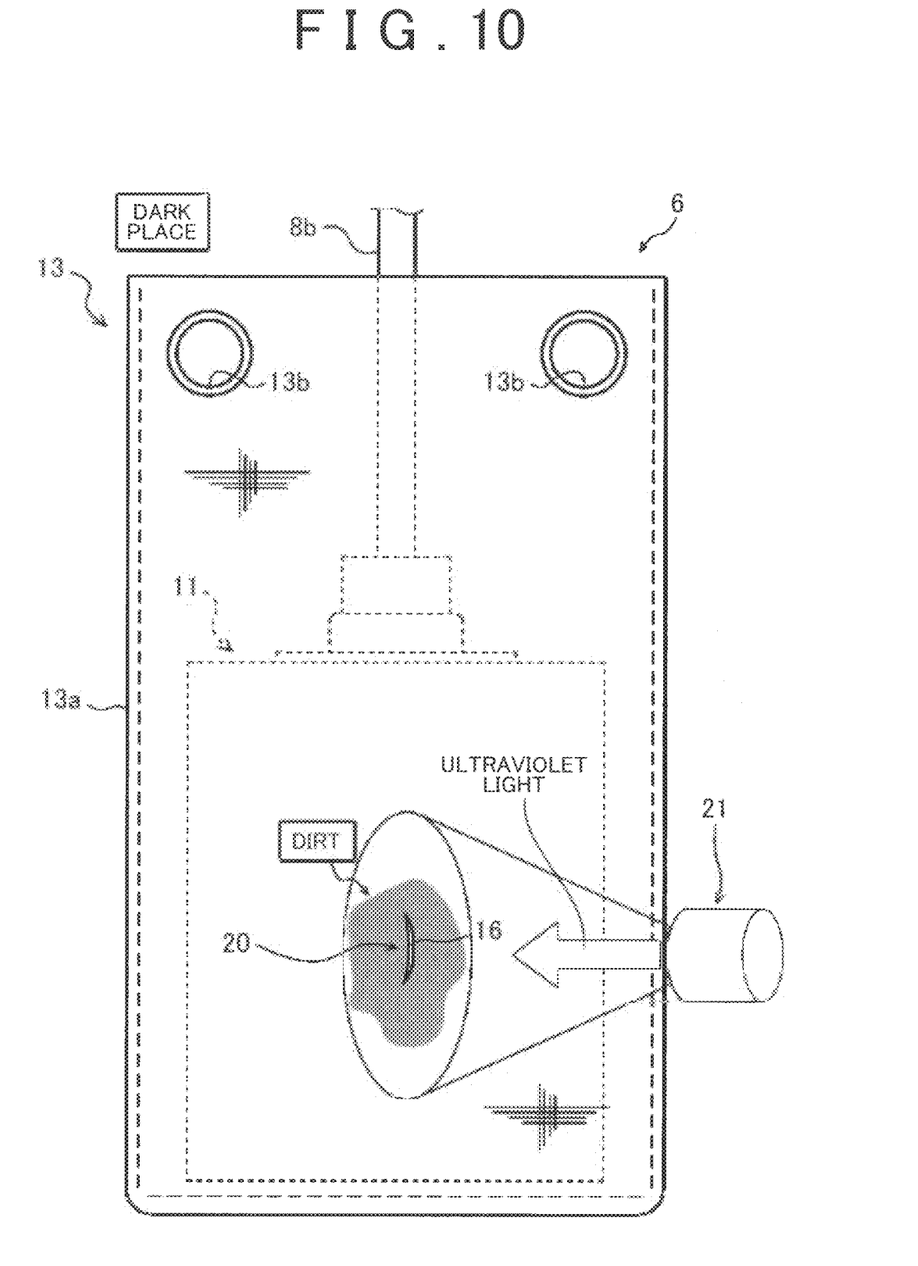
FIG. 10 is a view showing a method of detecting a rupture in the abutment member in a case where a member that emits light by being irradiated with ultraviolet light is used as the light-emitting member.

In the case where a fluorescent member that emits light by being irradiated with ultraviolet light by light irradiation means (black light) 21 is adopted as the light-emitting portion 16, the rupture portion 20 can be detected by arranging the abutment member 6 in a dark place and irradiating the abutment member 6 with ultraviolet light through the use of the light irradiation means 21 as shown in FIG. 10.

In the case where the rupture portion 20 is not created in the abutment member 6, ultraviolet light does not reach the light-emitting portion 16 in the outer bag 13, and the surface of the abutment member 6 remains dark. Therefore, it can be easily grasped that the rupture portion 20 is not created in the outer bag 13. In the case where the rupture portion 20 is created in the abutment member 6, when ultraviolet light reaches the light-emitting portion 16 through the rupture portion 20, the light-emitting portion 16 emits light. Therefore, the rupture portion 20 emerges on the surface of the abutment member 6, so the presence of the rupture portion 20 can be easily grasped.

Figure 11:
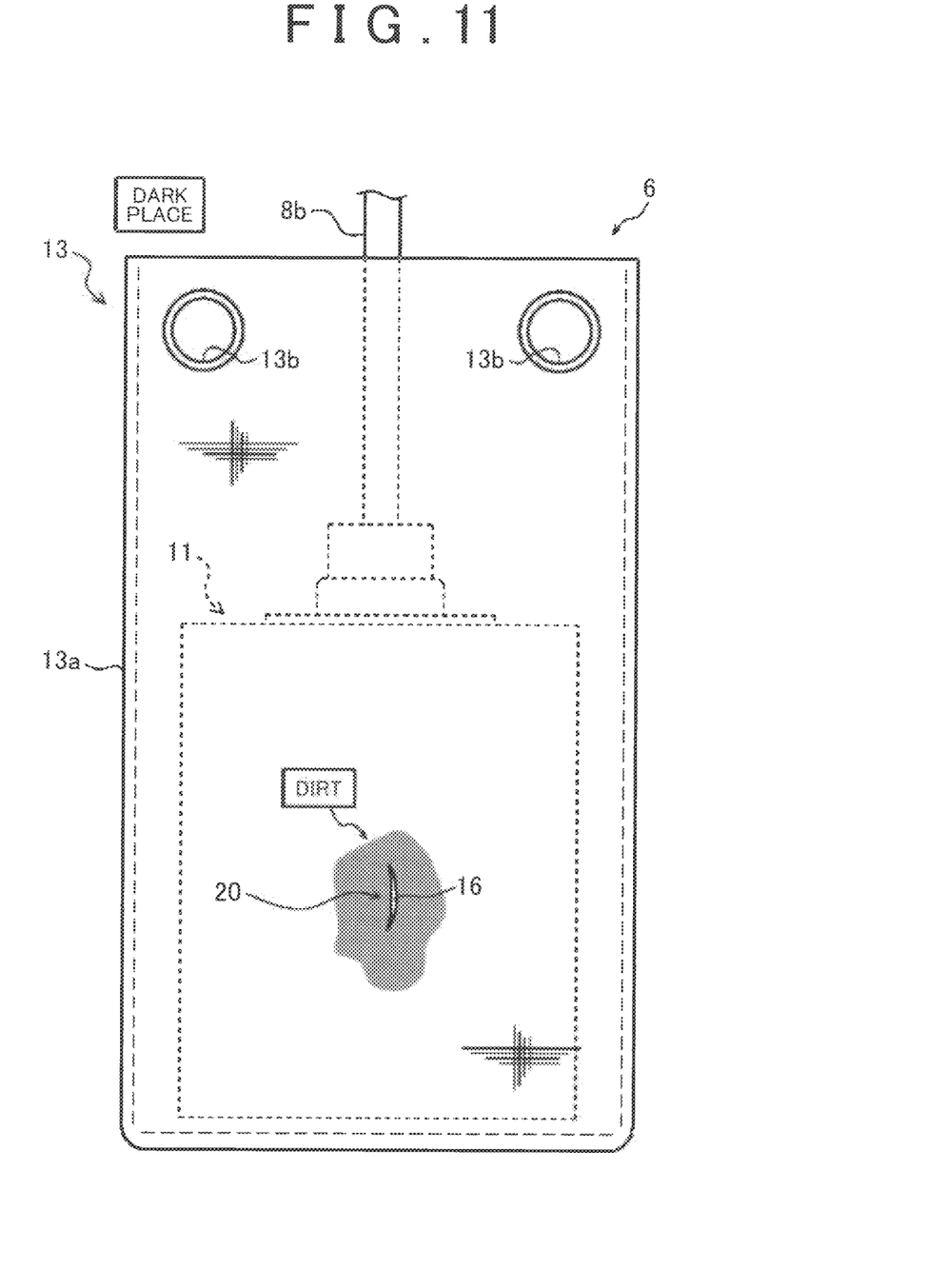
FIG. 11 is a view showing a method of detecting a rupture in the abutment member in a case where a light storage member is used as the light-emitting member.

In the case where a light storage member is adopted as the light-emitting portion 16, the rupture portion 20 can be detected by arranging the abutment member 6 in a dark place as shown in FIG. 11.

In the case where the rupture portion 20 is not created in the abutment member 6, external light does not reach the light-emitting portion 16 in the outer bag 13, and the light-emitting portion 16 does not emit light. Therefore, as a matter of course, the surface of the abutment member 6 remains dark, and it can be easily grasped that the rupture portion 20 is not created in the outer bag 13. In the case where the rupture portion 20 is created in the abutment member 6, external light reaches the light-emitting portion 16 through the rupture portion 20, and is stored in the light-emitting portion 16. Therefore, when the abutment member 6 is arranged in a dark place, the rupture portion 20 emerges on the surface of the abutment member 6 due to the emission of light from the light-emitting portion 16, so the presence of the rupture portion 20 can be easily grasped.

As described above, the creation of the rupture portion 20 is quite obvious by confirming the light-emitting portion 16 that emits light through the rupture portion 20. Therefore, the rupture portion 20 can be detected independently of the state of dirt on the surface of the outer bag 13. Eventually, the breakage of the inner bag 11 can be obviated.

Other embodiments of the invention regarding the arrangement of the light-emitting portion 16 will be described hereinafter, using FIG. 9. In the second embodiment of the invention shown in FIG. 9 (b), the light-emitting portion 16 is arranged on the surface of the lining 13c of the outer bag 13 (the face opposed to the inner bag 11). The light-emitting portion 16 that is used in this arrangement situation can adopt a mode in which a light-emitting member is configured in the shape of a sheet and stuck to the lining 13c, a mode in which a thread-like light-emitting member is woven into the lining 13c, a mode in which a paint-like light-emitting member is applied to the lining 13c, or the like.

In the third embodiment of the invention shown in FIG. 9 (c), the lining 13c of the outer bag 13 serves as a light-emitting member, thus constituting the light-emitting portion 16. The lining 13c itself can be made to serve as the light-emitting portion 16, for example, by applying a mixture of PET and the light-emitting member (a light storage pigment or a fluorescent substance) to the reverse face of the bag body 13a.

In the second embodiment of the invention and the third embodiment of the invention, which have been described above, the light-emitting portion 16 is arranged on the inner face of the outer bag 13. In this manner, the visibility of the rupture portion 20 can be enhanced, and the detection accuracy can be enhanced by causing the region close to the rupture portion 20 to emit light.

In the fourth embodiment of the invention shown in FIG. 9 (d), the light-emitting portion 16 is arranged on the surface of the bag body 11a of the inner bag 11 (the face opposed to the outer bag 13). The light-emitting portion 16 that is used in this arrangement situation can adopt a mode in which a light-emitting member is configured in the shape of a sheet and stuck to the surface of the bag body 11a, a mode in which a paint-like light-emitting member is applied to the bag body 11a, or the like.

In the fifth embodiment of the invention shown in FIG. 9 (e), the surface of the bag body 11a of the inner bag 11 serves as a light-emitting member, thus constituting the light-emitting portion 16. The bag body 11a itself can be made to serve as the light-emitting portion 16, for example, by fabricating the bag body 11a through the use of a mixture of NBR and the light-emitting member (a light storage pigment or a fluorescent substance).

In the fourth embodiment of the invention and the fifth embodiment of the invention, which have been described above, the light-emitting portion 16 is arranged on the outer face of the inner bag 11. This configuration makes it possible to prevent the light-emitting portion 16 from breaking when the rupture portion 20 is created in the outer bag 13. Accordingly, the rupture portion 20 can be prevented from being overlooked.

In the sixth embodiment of the invention shown in FIG. 9 (f), the light-emitting portion 16 is arranged on each of the surface of the bag body 11a of the inner bag 11 and the reverse face of the outer bag 13 (the surface of the lining 13c). This configuration makes it possible to cause the rupture portion 20 to emerge due to the light-emitting portion 16 remaining on the surface of the bag body 11a of the inner bag 11 even in the case where, for example, the light-emitting portion 16 that is arranged on the surface of the lining 13c of the outer bag 13 is cut and the light-emitting portion 16 on the outer bag 13 side does not appear at the rupture portion 20.

Incidentally, in arranging the light-emitting portion 16, it is preferable to consider the concept of preventing, to the utmost, the thicknesses of the outer bag 13 and the inner bag 11 from increasing, so as not to impede the adaptation properties of the abutment member 6 to the shape of the work.

INDUSTRIAL APPLICABILITY

The invention is applicable to a gripping device that grips a work through clamping.

DESCRIPTION OF REFERENCE NUMERALS

1 GRIPPING DEVICE
2 GRIPPING PORTION
6 ABUTMENT MEMBER
11 INNER BAG
12 PARTICULATE MATTER
13 OUTER BAG
16 LIGHT-EMITTING PORTION

The invention claimed is:

1. A gripping device comprising:
a gripping portion to grip a work while clamping the work;
an abutment member being annexed on a region of the gripping portion that abuts on the work, wherein
the abutment member is equipped with an inner bag that is made of a material having elasticity, a particulate matter with which the inner bag is filled, and an outer bag that covers the inner bag,
the particulate matter is hardened while being deformed into a shape matching a contour of the work by increasing a ratio of a volume of the particulate matter to an inner volume of the inner bag with the work gripped by the gripping portion, and
a reverse face of the outer bag and a surface of the inner bag have a light-emitting portion therebetween.

2. The gripping device according to claim 1, wherein the light-emitting portion is provided on at least one of the reverse face of the outer bag and the surface of the inner bag.

3. The gripping device according to claim 2, wherein the light-emitting portion emits light in response to ultraviolet light.

4. The gripping device according to claim 2, wherein the light-emitting portion is constituted by a light storage member.

5. The gripping device according to claim 1, wherein the light-emitting portion emits light in response to ultraviolet light.

6. The gripping device according to claim 1, wherein the light-emitting portion is constituted by a light storage member.

\* \* \* \* \*